United States Patent
Durif

(10) Patent No.: US 6,246,562 B1
(45) Date of Patent: Jun. 12, 2001

(54) CONTROL DEVICE OF AN ELECTROMAGNET, WITH A POWER SUPPLY CIRCUIT SUPPLIED BY THE HOLDING CURRENT OF THE ELECTROMAGNET

(75) Inventor: Ghislain Durif, Meylan (FR)

(73) Assignee: Schneider Electric Industries SA (FR)

( * ) Notice: Subject to any disclaimer, the term of this patent is extended or adjusted under 35 U.S.C. 154(b) by 0 days.

(21) Appl. No.: 09/448,768

(22) Filed: Nov. 24, 1999

(30) Foreign Application Priority Data

Dec. 7, 1998 (FR) .................................. 98 15553

(51) Int. Cl.[7] .................................................. H01H 9/00
(52) U.S. Cl. ............................................. 361/154; 361/187
(58) Field of Search .................................. 361/152–156, 361/160, 139, 194–198, 187

(56) References Cited

U.S. PATENT DOCUMENTS

| | | | |
|---|---|---|---|
| 4,729,056 | * 3/1988 | Edwards et al. | 361/153 |
| 5,214,561 | * 5/1993 | Morita | 361/187 |
| 5,754,386 | 5/1998 | Barbour et al. | 361/154 |
| 5,930,104 | * 7/1999 | Kadah et al. | 361/187 |

FOREIGN PATENT DOCUMENTS 0 353 533 A1   2/1990  (EP) .

* cited by examiner

*Primary Examiner*—Michael J. Sherry
(74) *Attorney, Agent, or Firm*—Parkhurst & Wendel, LLP

(57) ABSTRACT

The control device comprises a holding coil, an electronic switch and a power supply circuit connected in series to the terminals of a supply voltage of the coil. A circuit for measuring the holding current is connected in parallel with the power supply circuit and comprises in series an additional electronic switch and a measuring resistor. The power supply circuit is thus supplied by the holding current flowing in the coil and the additional electronic switch is periodically closed to measure the holding current which is regulated by a microprocessor-based circuit controlling the two electronic switches.

7 Claims, 4 Drawing Sheets

CONTROL DEVICE OF AN ELECTROMAGNET, WITH A POWER SUPPLY CIRCUIT SUPPLIED BY THE HOLDING CURRENT OF THE ELECTROMAGNET

BACKGROUND OF THE INVENTION

The invention relates to a control device of an electromagnet comprising at least one holding coil connected in series with an electronic switch to the terminals of a supply voltage of the coil, means for measuring the holding current flowing in the holding coil, control means for controlling the electromagnet comprising means for regulating the holding current connected to the means for measuring the holding current and to a control electrode of the electronic switch, and power supply means of the control means.

Circuit breakers generally comprise a certain number of electrical auxiliaries, more particularly closing electromagnets (XF) or opening electromagnets. Two types of opening electromagnets, or voltage trip releases, are generally provided. They comprise an electromagnet which must be actuated when certain conditions having to cause opening of the circuit breaker are met with. An under-voltage release (MN) causes opening of the circuit breaker when the voltage of the power system to be protected drops below a certain threshold, and a shunt release (MX) causes opening of the circuit breaker when the power system voltage exceeds another threshold.

For control of an electromagnet, it is known (FR-A-2,133,652) to temporarily supply a relatively high inrush current, followed by a lower holding current. This can be achieved either with a device comprising a single coil, in which the current is switched to constitute the holding current, or with a double coil formed by an inrush coil and a holding coil. It is also known to regulate the inrush and holding currents to preset levels (FR-A-2,568,715). This device is supplied by a power supply circuit which dissipates a non-negligible power and is therefore both costly and voluminous.

Voltage supply of the circuits of a control device of an electromagnet may require production of an auxiliary supply voltage. The document EP-A-353,533 proposes using for this purpose the voltages induced in a control coil of the electromagnet when the transistors connected in series with the coil are turned off. This embodiment does not enable the current flowing in the coil to be regulated since a part of this current is branched off to the power supply circuit.

SUMMARY OF THE INVENTION

The object of the invention is to achieve a device enabling the holding current to be regulated simply while supplying the supply voltages necessary for the device inexpensively and in a small volume.

According to the invention, this object is achieved by the fact that the power supply means of the control means are connected in series with the holding coil and the electronic switch in such a way as to be supplied by the holding current, the means for measuring the holding current comprising a measuring circuit connected in parallel with the power supply means and comprising in series an additional electronic switch and a measuring resistor, the control means being connected to the terminals of the resistor and to a control electrode of the additional electronic switch in such a way as to turn the additional electronic switch on periodically.

BRIEF DESCRIPTION OF THE DRAWINGS

Other advantages and features will become more clearly apparent from the following description of particular embodiments given as non-restrictive examples only and represented in the accompanying drawings in which.

DETAILED DESCRIPTION OF THE PREFERRED EMBODIMENT

Figure 1:
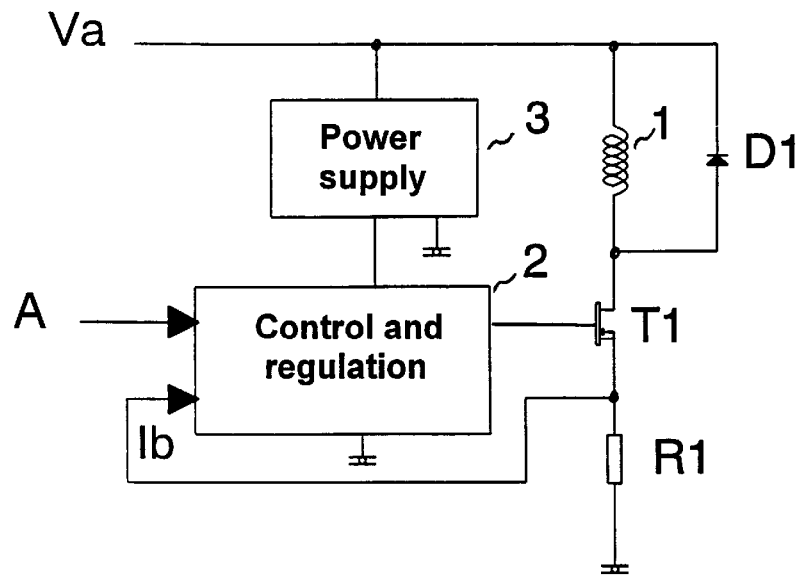
FIGS. 1 and 2 represent two control devices according to the prior art.

The device according to FIG. 1, which is of the type described in the document FR-A-2,568,715, comprises a coil 1 connected in series with a transistor T1 and a measuring resistor R1 to the terminals of a supply voltage Va. In conventional manner, a free-wheel diode D1 is connected in parallel with the coil 1. A control and regulation circuit 2 is connected to a control electrode of the transistor T1. An input of the circuit 2 receives control signals A of the electromagnet. The circuit 2 is also connected to the terminals of the resistor R1 so as to receive signals Ib representative of the current flowing in the coil 1 when the transistor T1 is turned on. The circuit 2 thus both enables the device to be controlled and the current in the coil to be regulated to preset values, independent of the supply voltage Va. A power supply circuit 3, connected to the terminals of the voltage Va supplies a stabilized auxiliary supply voltage Vb1 to the circuit 2.

In the device according to FIG. 1, the power supply circuit 3 dissipates a power which is not negligible. As an example, if the power supply current it has to supply is about 4 mA and if the voltage Va reaches 500V, the power dissipated by the power supply circuit can reach 2W. As the electromagnet coil conventionally dissipates a power of about a few watts, the relative volume of the power supply circuit is disproportionate. The use of a switching power supply circuit 3 might enable its consumption to be limited, but would not solve either the problem of cost or that of the volume.

Figure 2:
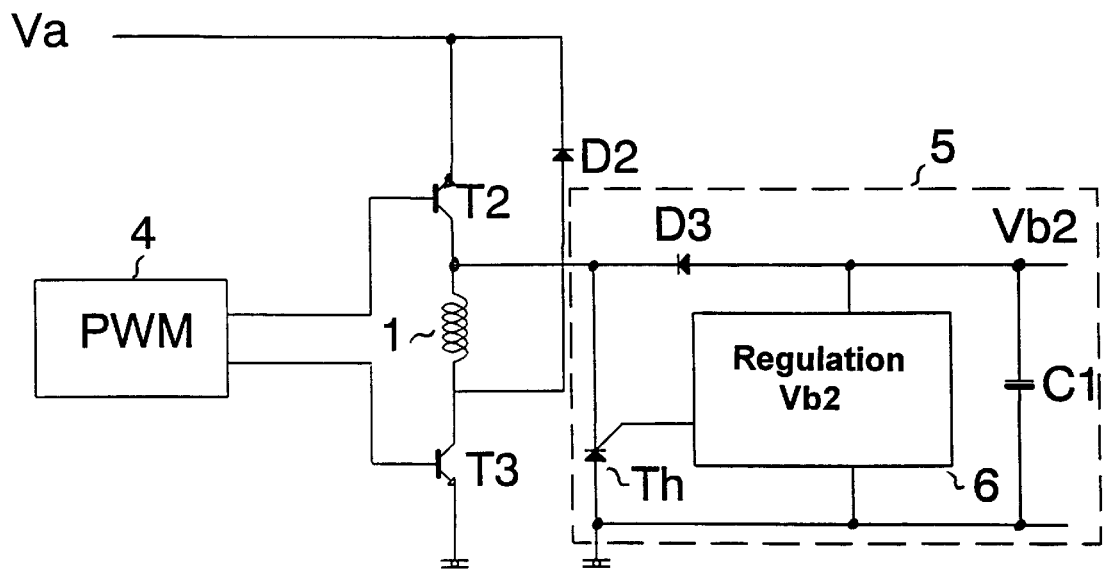

The device according to FIG. 2, which is of the type described in the document EP-A-353,533, comprises a coil 1 connected in series with two transistors T2 and T3 to the terminals of the power supply voltage Va. A control circuit 4, of the pulse width modulation (PWM) type, is connected to the control electrodes of the transistors T2 and T3. A power supply circuit 5 enables an auxiliary supply voltage Vb2, negative in the embodiment represented in FIG. 2, to be derived from the voltage Va. The point common to the coil 1 and to the collector of the NPN-type transistor T3 is connected to the voltage Va by means of a diode D2, whereas the point common to the coil 1 and to the collector of the PNP-type transistor T2 is grounded by means of a thyristor Th. The thyristor Th is used to regulate the auxiliary supply voltage Vb2 which appears at the terminals of a capacitor C1 connected, in series with a diode D3, to the terminals of a thyristor Th. A regulation circuit 6 of the voltage Vb2 is connected in parallel to the capacitor C1 and supplies the trigger of the thyristor Th with control signals of the thyristor. When the transistor T2 switches from the on state to the off state, under the control of the circuit 4, a voltage is induced in the coil 1. This results in a negative voltage at the cathode of the diode D3, which thus charges the capacitor C1 negatively. When the required voltage is obtained at the terminals of the capacitor C1, the regulation circuit 6 of the voltage Vb2 maintains this voltage at the required value by means of the thyristor Th.

In the circuit according to FIG. 2, it is not possible to regulate the current flowing in the coil to a preset value using measurement of the current by a resistor connected in series with the latter as in the device according to FIG. 1. A part of the current flowing in the coil is in fact branched off to the power supply circuit 5.

Figure 3:
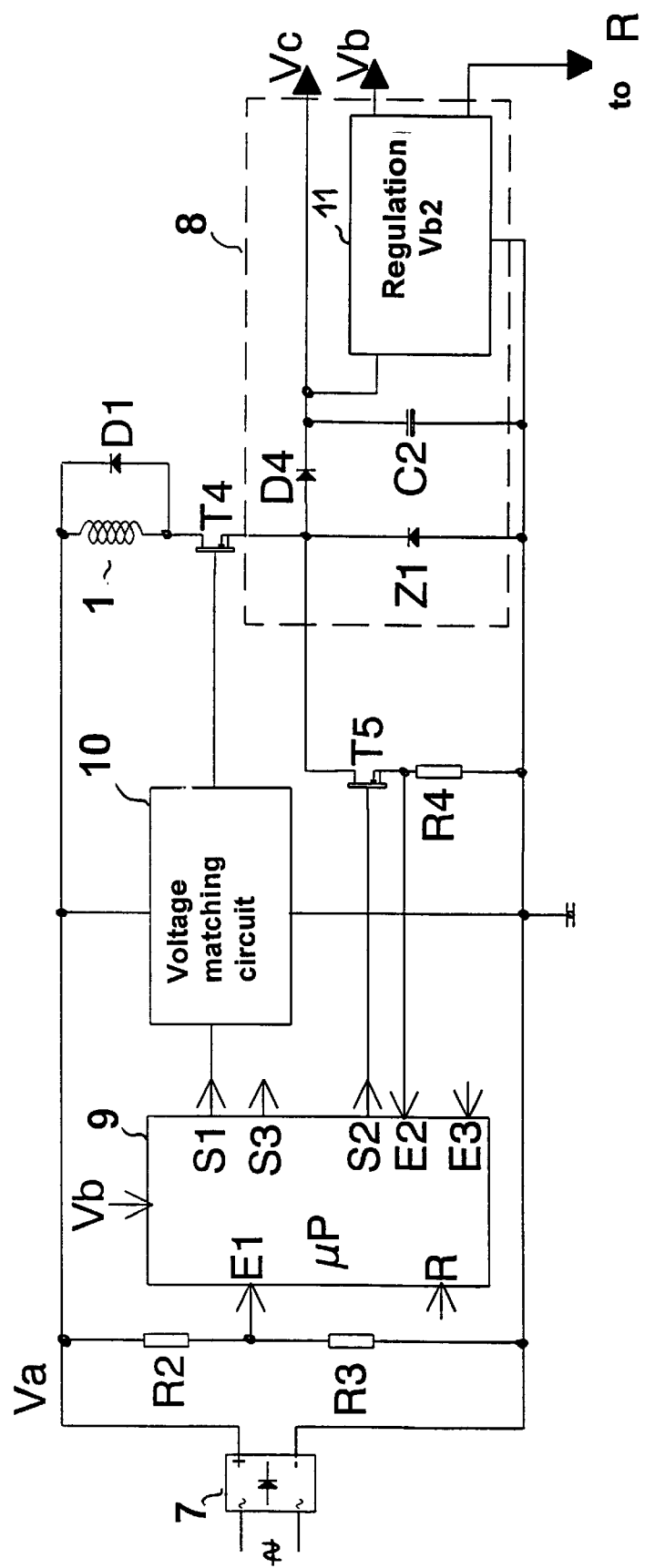
FIG. 3 illustrates a first embodiment of a device according to the invention.

In the embodiment of the invention according to FIG. 3, the control device is connected by a full-wave rectifier bridge 7 to an AC voltage. The rectifier bridge supplies the supply voltage Va of at least one coil 1. In a preferred embodiment, the device is a double-coil device with an inrush coil (not represented in FIG. 3) and a holding coil constituted by the coil 1 in FIG. 3.

The coil 1 is connected in series with a transistor T4, of MOS type in the figure, and a power supply circuit 8 which supplies two auxiliary supply voltages Vb and Vc.

Control of the electromagnet is performed by a microprocessor-based circuit 9. In FIG. 3, it comprises an input E1 connected to the mid-point of a voltage divider formed by two resistors R2 and R3 connected in series to the terminals of the supply voltage Va. The device can thus be used for control of an electromagnet of a voltage trip device, the voltage at the terminals of R3, representative of the voltage applied to the input of the rectifier bridge 7, being able to be compared by the microprocessor with preset thresholds, minimum for an under-voltage release; or maximum for a shunt release.

An output S1 of the microprocessor-based circuit 9 is connected to the control electrode of the transistor T4 by means of a voltage matching circuit 10, itself supplied by the voltage Va. The microprocessor-based circuit 9 controls the state of the transistor T4, on the one hand according to the value of the voltage at the terminals of the resistor R3, and on the other hand so as to clamp the holding current in the coil 1 to a preset value. To perform this clamping or regulation of the holding current, the microprocessor-based circuit 9 requires a measurement of this current. For this, the device comprises a measuring circuit connected in parallel to the power supply circuit 8. The measuring circuit comprises a measuring resistor R4 connected in series with a transistor T5, of MOS type in the figure. The control electrode of the transistor T5 is connected to an output S2 of the circuit 9, whereas the voltage at the terminals of the measuring resistor R4 is applied to an input E2 of the circuit 9.

In the particular embodiment of FIG. 3, the power supply circuit 8 comprises a Zener diode Z1 connected in series with the coil 1 and transistor T4 to the terminals of the supply voltage Va. A diode D4 is connected, in series with a capacitor C2, to the terminals of the Zener diode Z1. A regulation circuit 11 of the auxiliary supply voltage Vb is connected in parallel with the capacitor C2.

In FIG. 3, the auxiliary supply voltage Vb is applied to a power supply input of the microprocessor-based circuit 9. The non-regulated, auxiliary supply voltage Vc is the voltage at the terminals of the capacitor C2. It can be used for control of an inrush coil as will be explained in greater detail with respect to FIG. 4. In a preferred embodiment, Vb is close to 5V whereas Vc is about 10V.

The device according to FIG. 3 operates in the following manner. Flow of a regulated holding current in the coil 1 is controlled by the microprocessor-based circuit 9. When the transistor T4 is on, the holding current develops a preset voltage, about 10V for example, at the terminals of the Zener diode Z1, which voltage charges the capacitor C2 by means of the diode D4. The non-regulated auxiliary supply voltage Vc is thus obtained at the terminals of the capacitor C2. This voltage is applied to the regulation circuit 11 of Vb, which can be of any known type, for example a linear regulator, so as to supply the auxiliary supply voltage Vb.

Periodically, preferably every 312 $\mu$s, the microprocessor-based circuit 9 simultaneously applies turn-on command signals of the transistors T4 and T5 to its outputs S1 and S2 during the time necessary for voltage measurement at the terminals of the resistor R4. The transistor T5 being on, the voltage applied to the terminals of the Zener diode Z1, i.e. to the input of the power supply circuit 8, decreases, for example to a value close to a few volts (3V for example). The holding current no longer supplies the power supply circuit but the reverse-polarized diode D4 prevents discharge of the capacitor C2 through the transistor T5. The holding current flowing in the coil then flows totally, via the transistor T5, through the measuring resistor R4. The microprocessor-based circuit 9 thus periodically obtains a measurement representative of the holding current on its input E2. This measurement is used by the microprocessor-based circuit 9 to regulate the holding current. If the holding current is less than or equal to a preset setpoint value, the circuit 9 keeps the transistor T4 turned on until the next measurement. If on the other hand the holding current is greater than the setpoint value, the transistor T4 is turned off until the next measurement.

The power supply circuit 8 of FIG. 3 only dissipates a very low power, about 20 mW for a supply current of 4 mA with a voltage Vb of 5V, regardless of the level of the voltage Va.

Figure 4:
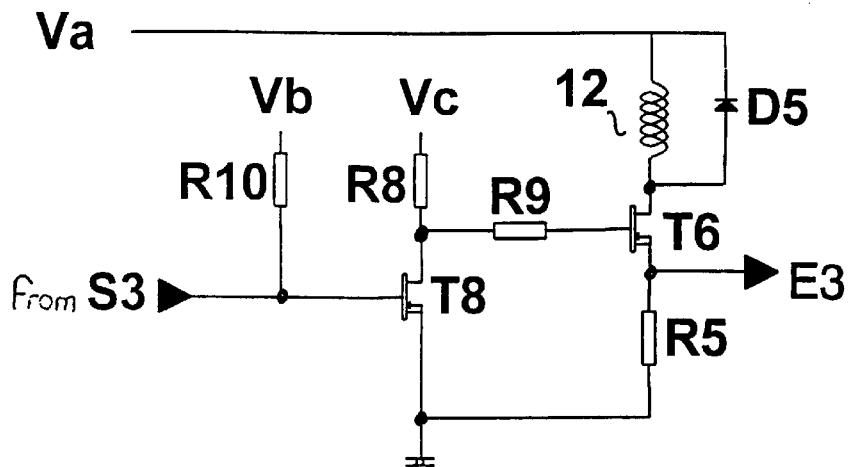
FIG. 4 illustrates the additional elements of the device according to FIG. 3 in a second embodiment comprising an inrush coil.

The device according to FIG. 3 can be completed by the additional elements represented in FIG. 4. In this embodiment, the device comprises in addition an inrush coil 12 connected in series with a transistor T6 and a measuring resistor R5 to the terminals of the supply voltage Va. A freewheel diode D5 is connected in parallel with the coil 12. The microprocessor-based circuit 9 comprises a control output S3 designed to control the flow of an inrush current in the inrush coil 12. In FIGS. 3 and 4, this current can be regulated in conventional manner by the microprocessor-based circuit 9 which receives on an input E3 signals representative of the voltage at the terminals of the measuring resistor R5, i.e. signals representative of the inrush current flowing in the inrush coil 12.

The control signals coming from the microprocessor-based circuit 9 are very low voltage signals, for example about 5V, whereas the supply voltage Va of the coils 1 and 12 can reach 220V or even 500V. This requires fitting of voltage matching circuits between the outputs S1 and S2 and the control electrodes of the transistors T4 and T6.

Figure 5:
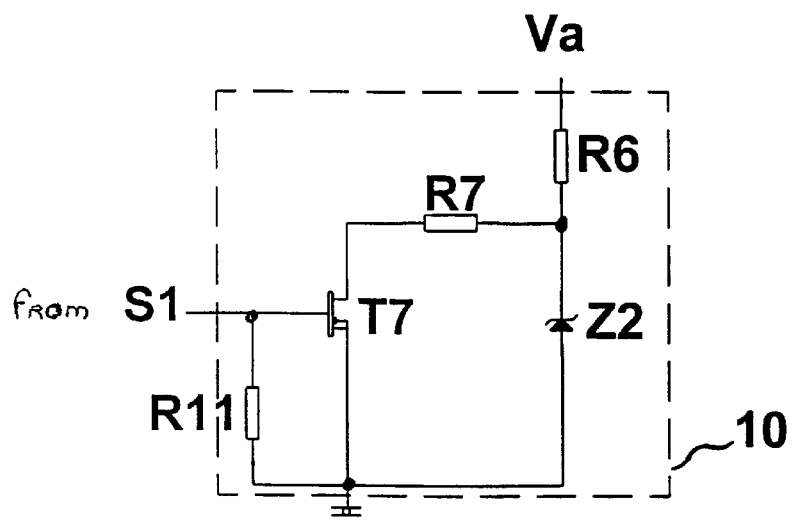
FIG. 5 illustrates a particular embodiment of the voltage matching circuit of the device according to FIG. 3.

A particular embodiment, of known type, of the voltage matching circuit 10 of FIG. 3 is represented in FIG. 5. It comprises a high-voltage resistor R6 connected in series with a Zener diode Z2 to the terminals of the supply voltage Va. A resistor R7 is connected in series with a transistor T7, in parallel with the Zener diode Z2. The control electrode of the transistor T7 is connected to the output S1 of the microprocessor-based circuit 9. The point common to the resistors R6 and R7 and to the Zener diode Z2 forms the output of the voltage matching circuit, connected to the control electrode of the transistor T4. When the level of the logic signals applied to S1 is low (for example 0V), the transistor T7 is turned off and the control electrode of the transistor T8 is at a high level, corresponding to the limiting voltage of the Zener diode Z2, greater than the voltage Vc. As an example, the limiting voltage of the Zener diode Z2 may be about 18V. The transistor T4 is then turned on. If on the other hand the level of the logic signals applied to S1 is high (for example 5V), the transistor T7 is turned on and short-circuits the Zener diode Z2, switching the control electrode of the transistor T4 back to a low level and consequently turning the transistor T4 off.

A circuit of the same type could be used between the output S3 and the control electrode of the transistor T6. However, such a circuit requiring the use of a high-voltage resistor R6 and a Zener diode Z2 is voluminous. The particular embodiment of FIG. 4 enables this drawback to be overcome by using the auxiliary supply voltage Vc supplied by the power supply circuit 8 as supply voltage of the voltage matching circuit. It should be noted that the auxiliary supply voltage Vb, of about 5V, would not be sufficient to make the transistor T6 switch. The voltage Vc, on the other hand, of about 10V, is quite suitable. The voltage matching circuit of FIG. 4 comprises two resistors R8 and R9 connected in series between the auxiliary supply voltage Vc and the control electrode of the transistor T6. A transistor T8, of MOS type, is connected between the point common to the resistors R8 and R9 and the ground. The control electrode of the transistor T8 is connected to the output S3 and to the auxiliary supply voltage Vb by means of a resistor R10. When the logic signals applied to S3 are at a low level, the transistor T8 is turned off and the transistor T6 is turned on. On the other hand, when the logic signals applied to S3 are at a high level, the transistor T8 is turned on and turns the transistor T6 off.

The auxiliary supply voltage regulation circuit 11 can also comprise (FIG. 3) an output connected to a reset input R of the microprocessor-based circuit 9, so as to reset the microprocessor when its supply voltage Vb drops below a certain threshold.

On power-up of the device, the microprocessor-based circuit 9 is automatically reset. Its input/output ports are at high impedance. In FIG. 4, a resistor R11 connected to the control electrode of the transistor T7 and the ground sets the potential of this electrode to 0V turning the transistor T7 off, which turns the transistor T4 on. Charging of the capacitor C2 therefore takes place automatically, guaranteeing startup of the device.

Recent microprocessors often integrate the reset function in case of a decrease of their supply voltage. In this case, the output of the circuit 11 connected to the input R of the circuit 9 is no longer indispensable and the voltage Vb no longer has to be so precise. It is then possible to simplify the power supply circuit 8. A simplified alternative version is illustrated in FIG. 6.

Figure 6:
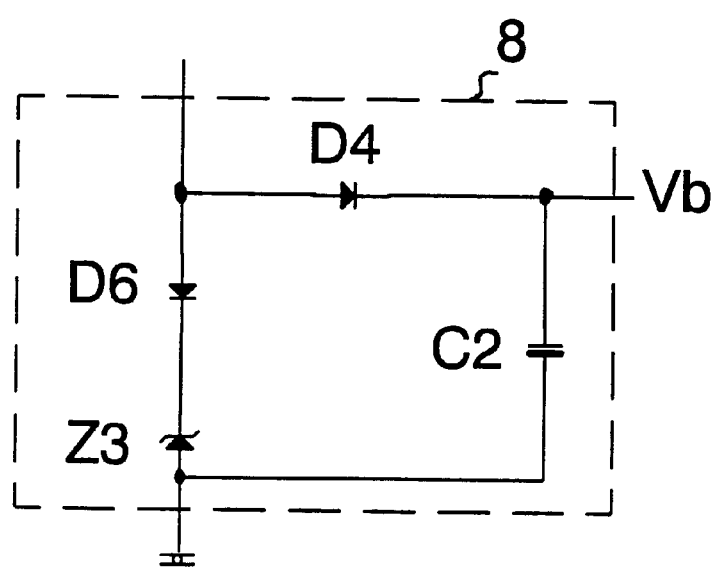
FIG. 6 represents an alternative embodiment of the power supply circuit of the device according to FIG. 3.

In FIG. 6, the regulation circuit 11 is eliminated, the Zener diode Z1 replaced by a circuit comprising in series a diode D6, normally on, and a Zener diode Z3 whose threshold voltage is equal to the required auxiliary supply voltage Vb, for example about 5V. The diode D6 enables the effect of temperature variations on the voltage of the diode D4 to be compensated.

If the control device comprises the simplified power supply circuit 8 of FIG. 6, the auxiliary supply voltage Vc is no longer available for supply of the voltage matching circuit of FIG. 4. The voltage at the terminals of the Zener diode Z2 of the voltage matching circuit 10 (FIG. 5) can be used as a replacement for the auxiliary supply voltage Vc.

To unlatch the electromagnet, the current in the inrush and holding coils has to be interrupted for at least 15 ms. Eliminating the holding current which supplies the supply voltage Vb of the microprocessor-based circuit 9 gives rise to the problem of maintaining this power supply during this period. For example, if the microprocessor-based circuit 9 consumes 4 mA, maintaining its power supply for 15 ms implies the use of a capacitor C2 (FIG. 3) of large size, and therefore voluminous. According to an improvement of the invention, to enable the size of the capacitor C2 to be reduced, the control device, as soon as an unlatching order commanding turn-off of the transistor T4 is sent, causes the microprocessor to switch to a particular standby mode, called STOP mode. In STOP mode, the microprocessor-based circuit has a greatly reduced consumption, for example about a few microamperes (1 to 10 $\mu$A). As the capacitor C2 is no longer charged by the holding current, it discharges slowly. When the voltage Vb falls below a preset threshold, the microprocessor is automatically reset, either by the regulation circuit 11, or by itself, or by any suitable comparison circuit. This reset, as in the power-up phase, automatically causes switching of the microprocessor input/output ports to high impedance and, consequently, turn-on of the transistor T4, charging of the capacitor C2 and increase of the auxiliary supply voltage Vb. However, the capacitor C2 is dimensioned for reset of the microprocessor to always take place after the 15 ms necessary for unlatching of the electromagnet. The electromagnet being unlatched, flow of a holding current in the coil 1 when reset takes place is insufficient to cause latching of the electromagnet, which requires a greater inrush current.

In the above description, coil 1 is a holding coil and coil 12 (FIG. 4) is an inrush coil. The invention also applies to the case wherein the device comprises only one coil 1 acting both as a holding coil and as an inrush coil depending on the current flowing through the coil, the microprocessor-based circuit 9 regulating the holding current to a level which is lower than the inrush current.

The device according to FIG. 3, in which the signals applied to the input E1 of the microprocessor-based circuit 9 are representative of the voltage of the power system to be protected, is more particularly suited to control of under-voltage or shunt releases (MN or MX).

The invention applies to any type of electromagnet and, in particular, also to circuit breaker closing electromagnets, a suitable control signal then being applied to the input E1.

What is claimed is:

1. A control device of an electromagnet comprising at least one holding coil connected in series with an electronic switch to the terminals of a supply voltage of the coil, means for measuring the holding current flowing in the holding coil, control means for controlling the electromagnet comprising means for regulating the holding current connected to the means for measuring the holding current and to a control electrode of the electronic switch, and power supply means of the control means, wherein the power supply means of the control means are connected in series with the holding coil and the electronic switch in such a way as to be supplied by the holding current, the means for measuring the holding current comprising a measuring circuit connected in parallel with the power supply means and comprising in series an additional electronic switch and a measuring resistor, the control means being connected to the terminals of the resistor and to a control electrode of the additional electronic switch in such a way as to turn the additional electronic switch on periodically.

2. The device according to claim 1, wherein the power supply means comprise a Zener diode in series with the holding coil and the electronic switch, and a diode connected in series with a capacitor to the terminals of the Zener diode.

3. The device according to claim 2, wherein the power supply means comprise a diode in series with the Zener diode.

4. The device according to claim 2, wherein the power supply means comprise a voltage regulation circuit in parallel with the capacitor.

5. The device according to claim 1, wherein the control means comprise a microprocessor-based circuit.

6. The device according to claim 5, wherein the control means comprise a voltage matching circuit connected between an output of the microprocessor-based circuit and the control electrode of the electronic switch.

7. The device according to claim 5, wherein the microprocessor-based circuit switches to a standby mode when it supplies an unlatching order to the electromagnet.

* * * * *